United States Patent [19]

McCulloch

[11] Patent Number: 4,561,630
[45] Date of Patent: Dec. 31, 1985

[54] VALVE

[75] Inventor: Alister L. McCulloch, Clayton, Australia

[73] Assignee: Chubb Australia Limited, Waterloo, Australia

[21] Appl. No.: 604,123

[22] Filed: Apr. 25, 1984

Related U.S. Application Data

[63] Continuation-in-part of Ser. No. 346,796, Feb. 8, 1982, abandoned, which is a continuation of Ser. No. 176,614, Aug. 8, 1980, abandoned.

[30] Foreign Application Priority Data

Aug. 10, 1979 [AU] Australia ............... 49772/79

[51] Int. Cl.⁴ .......................................... F16K 25/00
[52] U.S. Cl. ...................................... 251/84; 251/73; 251/77; 251/86; 251/114; 137/69; 137/527.4
[58] Field of Search ............... 251/95, 98, 115, 116, 251/298, 73, 74, 84, 86, 114; 137/68, 69, 527.4

[56] References Cited

U.S. PATENT DOCUMENTS

| 711,398 | 10/1902 | Hauson | 251/116 X |
|---|---|---|---|
| 1,822,655 | 9/1931 | Hamilton | 137/527.4 |
| 2,469,831 | 5/1949 | Lewis | 251/114 X |
| 2,919,884 | 1/1960 | Meusy | 251/86 |
| 3,015,337 | 1/1962 | Hookway | 251/74 X |
| 3,137,474 | 6/1964 | Sodenberg | 251/73 X |
| 3,612,097 | 10/1971 | Prince | 137/527.4 |
| 3,647,109 | 3/1972 | Hebblethwaite | 137/69 X |
| 4,074,889 | 2/1978 | Engel | 251/298 |
| 4,294,427 | 10/1981 | Cilny | 251/86 |

FOREIGN PATENT DOCUMENTS

| 2139632 | 3/1973 | Fed. Rep. of Germany | 137/527.4 |
|---|---|---|---|
| 244295 | 2/1926 | Italy | 251/114 |
| 1193581 | 6/1970 | United Kingdom | 137/527.4 |
| 1437061 | 5/1976 | United Kingdom | 251/114 |

Primary Examiner—Harold W. Weakley

[57] ABSTRACT

A valve for sealing off pressurized fluid for an extended period comprises, a body defining a passageway, a closure member in said passageway for closing off the latter against fluid flow, a pivotally mounted arm for maintaining the closure member in its passageway closing off condition, and a catch for releasably retaining the arm in the valve closed position. In one arrangement, the closure member includes a diaphragm which extends across and divides the passageway and is arranged to burst under a sufficient pressure differential, the arm carrying a backing plate which, in its valve closed position is superimpositioned against one face of the diaphragm to prevent it from bursting.

2 Claims, 6 Drawing Figures

VALVE

This is a continuation-in-part of co-pending application Ser. No. 346,796 filed Feb. 8, 1982, now abandoned, which is a continuation of abandoned application Ser. No. 176,614 filed on Sept. 8, 1980, now abandoned.

This invention relates to valves for use in sealing off pressurized fluid for extended periods. Such valves have particular application in association with pressurized fluid vessels such as those to be found in automatic fire extinguishing systems.

Automatic fire extinguishing systems typically include a bank of upright pressure cylinders containing freon or other gaseous fire extinguishing medium. Each cylinder is closed at its top by a rapid release valve which is held closed by leaked differential back pressure. Such valves are typically fitted with flexible 'O' ring seals associated with moveable pistons. These arrangements have been known to fail in the sense that they have not reliably sealed off the fire extinguishing medium for the necessary extended period, perhaps 5 to 10 years. Gradual loss of the medium has been known to occur passed the 'O' ring or through the controlled bleed typically employed to open the valve by relieving the leaked back pressure. Failure can of course have expensive and potentially dangerous results in the case of a fire protection system rendered substantially inoperative by the loss of most of its extinguishing medium. It is an objective of this invention to provide an improved valve particularly adapted to use as a rapid release valve for pressurized gas vessels.

The invention accordingly affords a valve comprising a valve for sealing off pressurized fluid for an extended period, comprising:
  a body defining a fluid flow passageway therethrough;
  a closure member disposed in said passageway and having a condition in which it closes off the latter against fluid flow;
  an arm mounted to said body for pivotal movement to and from a valve closed position in which the arm maintains the closure member in its passageway closing off condition; and
  catch means for releasably retaining said arm in said valve closed position.

In a preferred embodiment, the closure member acts as a backing plate for a diaphragm which extends across and divides said passageway and which is arranged to burst when sufficient pressure differential is applied across the diaphragm in the absence of reinforcement. In the valve closed condition of the arm, the backing plate is superimpositioned against one face of the diaphragm to afford said reinforcement and so prevent bursting of the diaphragm. The closure means may further include an insert incorporating said diaphragm, which insert is sealingly mounted to said body in said passageway. This insert may be sealingly mounted to said body by being screw threadingly engaged therewith to axially clamp a sealing ring between the insert and the body.

The backing plate may be carried by the arm by way of a ball and socket or like male/female coupling to afford an arrangement allowing the backing plate, at least within limits, to freely angularly adjust its disposition relating to the arm. Such coupling preferably incorporates means to adjust the displacement of the backing plate with respect to the arm, whereby to clamp the plate onto the diaphragm when the catch means is retaining the arm in the valve closed position.

In an alternative embodiment, the closure member may be arranged, in its passageway closing off condition, to axially clamp a sealing ring between the closure member and said body under pressure applied by said arm. In this case, the closure member is preferably directly coupled to the arm in a manner similar to that by which the backing plate of the preferred embodiment is carried by the arm.

The catch means may comprise a pivotally mounted latch having a relieved portion to firmly seat the arm. It may be associated with means for communicating an actuating signal to the catch means to release its engagement with the arm and so open the valve.

The invention will be further described, by way of example only, with reference to the accompanying drawings, in which.

Figure 1:
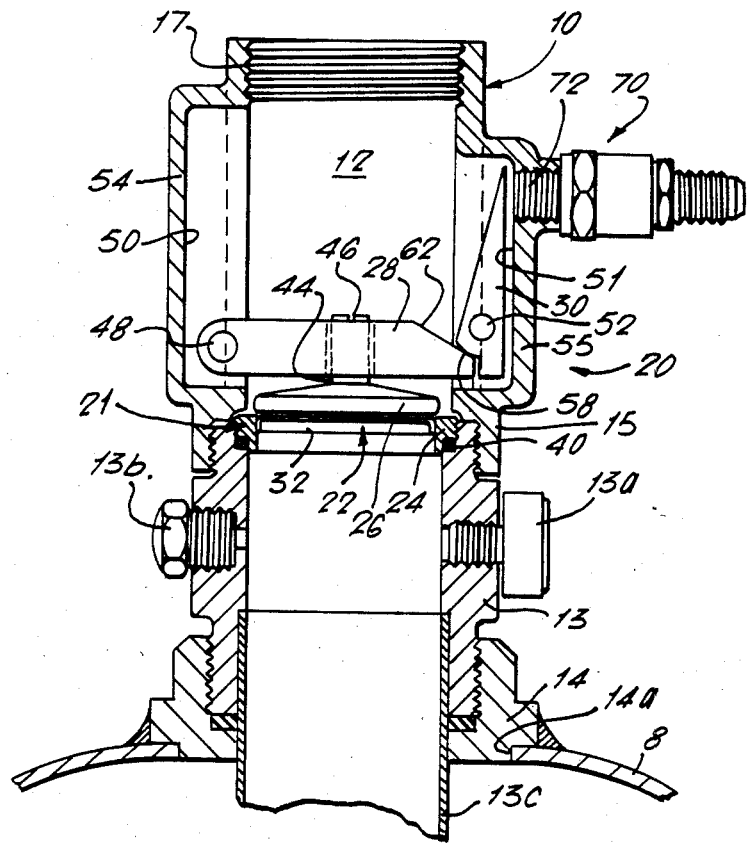
FIG. 1 is an axial cross-section of part of a gas cylinder cap assembly incorporating a valve constructed according to the invention.
Figure 2:
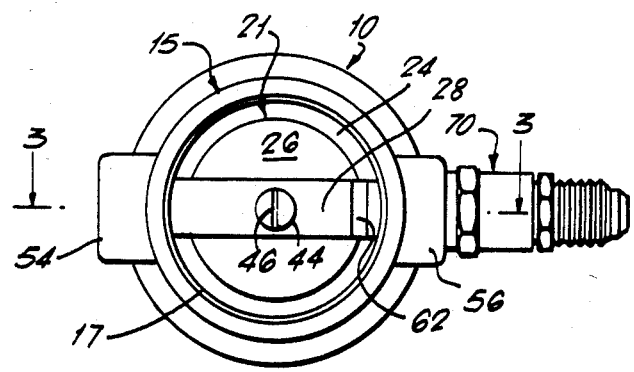
FIG. 2 is a plan view of the valve forming part of the assembly shown in FIG. 1.

The illustrated gas cylinder cap assembly incorporating valve 20 includes a valve body 10 which defines a straight, substantially uniform fluid flow passageway 12. Valve body 10 comprises a tubular portion 13 screw threadingly secured, at one end, with gasket 13a, into a neck 14 and at the other to a complementary annular housing 15 for the valve mechanism. Neck 14 is fixed by welding into the outlet port 14a of an upright high pressure gas cylinder 8. Thus, when in situ, valve body 10 is typically arranged with the axis of passageway 12 vertical. Annular housing 15 incorporates a screw threaded socket 17 which may be connected to a suitable flexible conduit along which the releaed gas is to be fed. Tubular portion 13 of valve body 10 is provided with a pressure gauge 13a and a relief plug 13b and receives a conduit 13c from the interior of vessel 8.

Figure 3:
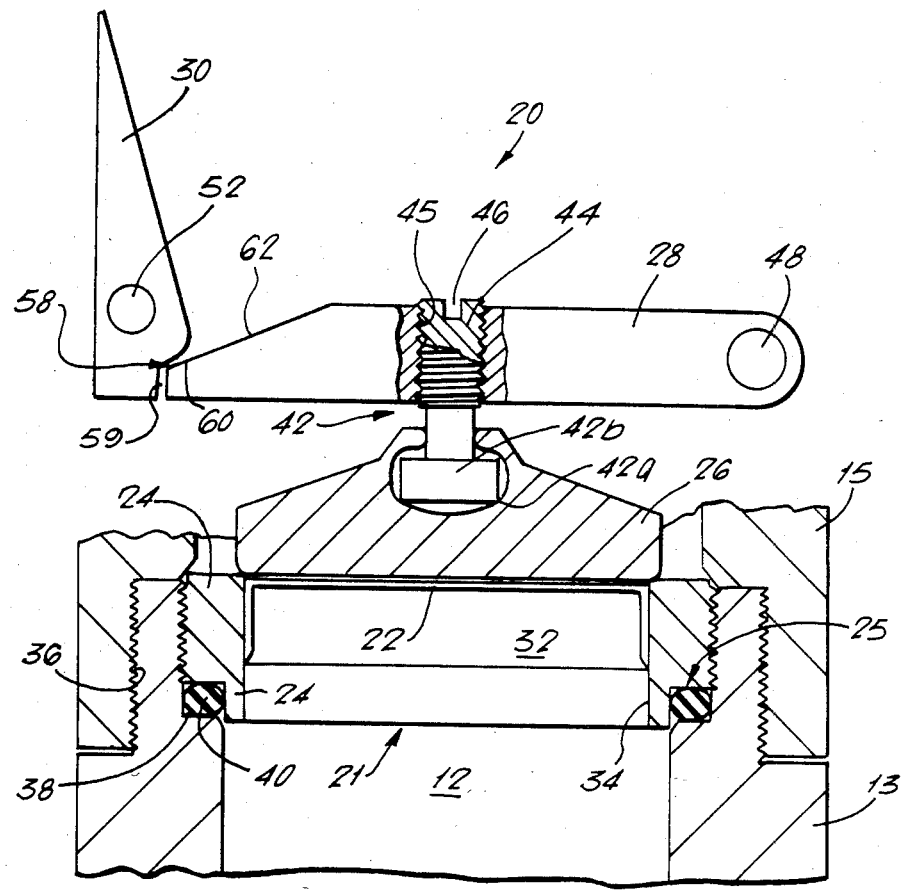
FIG. 3 is a cross-section on the line 3—3 in FIG. 2, showing only the principal components of the valve.

The principal components of valve 20 are a closure means 21, comprising a frangible metal diaphragm 22 mounted to a collar insert 24, a closure member in the form of a backing plate 26 for the diaphragm, a pivotally mounted arm 28 supporting backing plate 26, and catch means for arm 28 in the form of a latch 30. Frangible metal diaphragm 22 may be a brass foil and is typically of mean thickness about 0.05 mm. It is of shallow dish shape, forming a peripheral skirt 32 which is sealingly secured by welding within the bore 34 of insert 24 (FIG. 3) whereby the centre portion of the diaphragm extends flat across bore 34 substantially flush with one end of insert 24, so as to divide passageway 12.

Insert 24 is screw threadingly engaged in a counterbore 36 formed in the top of tubular portion 13 of valve body 10. Counter bore 36 and an annular external relief 25 on insert 24 afford opposed complementary shouders which co-operate to define an annular cavity 38 in which an elastomeric sealing ring 40 is trapped and axially compressively clamped.

Backing plate 26 is of disc form with a machined flat undersurface which firmly engages the top face of diaphragm 22 to reinforce it against rupture by gas pressure on its other face. Plate 26 is suspended from arm 28 by an adjustable male/female coupling 42 comprising an internally enlarged socket 42a in plate 26 and a T-projection 42b integrally formed as the head of an upstanding screw 44 which engages a complementary screw threaded aperture 45 in arm 28. The opposite, and uppermost, end face of screw 44 is formed with a tool engaging formation such as a screwdriver slot 46 to allow rotation of screw 44 to finely adjust the displacement of plate 26 with respect to arm 28. Coupling 42 may alternatively comprise, for example, a simple ball and socket coupling.

Arm 28 is pivotally mounted, on a pin 48, in one of a pair of opposed vertical slots 50, 51 in the side wall of passageway 12. Slots 50, 51 are defined within longitudinaly elongate radial extensions 54, 55 of housing 15 above diaphragm 22. Latch 30 is similarly mounted on a pin 52 in the other slot 51. An inside lower corner edge of latch 30 is relieved at 58 to provide a substantially upright abutment face 59 inside the axis of pin 52 and an engagement surface 60 substantially transverse to said abutment face 59, which co-operates with a chamfered engagement surface 62 formed at the opposed upper edge of arm 28. The outer extremity of said arm 28 is adjacent to and transverse to said chamfered engagement surface 62. Upward pressure on arm 28 tightly locks surface 62 against seat 60 and generates a force having a line of action which is displaced from the pivot ais of the pin 52 whereby the force tends to rotate latch 30 in a direction which brings abutment face 59 into firm engagement against an abutment face at the outer extremity of arm 28. Thus, arm 28 and latch 30 are geometrically locked against disengagement.

Means for rotating latch 30 to disengage seat 60 from surface 62 is indicated at 70. Means 70 includes a screw threaded spigot 72 for securement in a complementary lateral hole in housing 15 of valve body 10 to communicate an actuation signal to latch 30. For example, an internal push rod (not shown) may be forced through spigot 72 against the upper end of latch 30 by any suitable trigger device such as of pneumatic, hydraulic, electronic or manual type, mounted to the outer end of release means 70.

In the event of a fire the trigger device actuates the push rod which in turn rotates latch 30 to disengage seat 60 from face 62 and so release arm 28. The gas pressure on the diaphragm 22 will then no longer be restrained by backing plate 26: the assembly of arm and backing plate will therefore immediately rotate upwardly as the gas bursts through diaphragm 22.

It is believed that the reinforced diaphrgm valve illustrated can be relied upon to retain the gaseous medium within the cylinder for an extended period of time such as for example, 5 to 10 years. The metal diaphragm prevents leakage at the primary port and the arrangement permits the use of a trapped sealing ring in contrast to the floating ring of prior arrangements. The suspension of backing plate 26 for free angular adjustment in any dimension, at least within limits determined by the relative sizes of the neck of socket 42a and the screw 44, ensures that the plate is flat against the diaphragm. This alleviates the need to manufacture the valve with the very small tolerances which would otherwise be required since any unevenness at the plate/diaphragm interface would be inviting a breach at the gas pressures involved.

The straight form of the passageway 12 maximises pressure, perhaps required at distant locations. Moreover, in the normal operational position of the valve at the top of a gas cylinder, plate 26 will drop back onto insert 24 once the gas is exhausted from the cylinder and thus act as a check valve to prevent refilling of the cylinder by gas sequentially released from associated cylinders in a multiple cylinder protection system. At present, check valves are required as separate items. The check action of plate 26 may be aided where required by provision of a return spring acting on arm 28.

Figure 4:
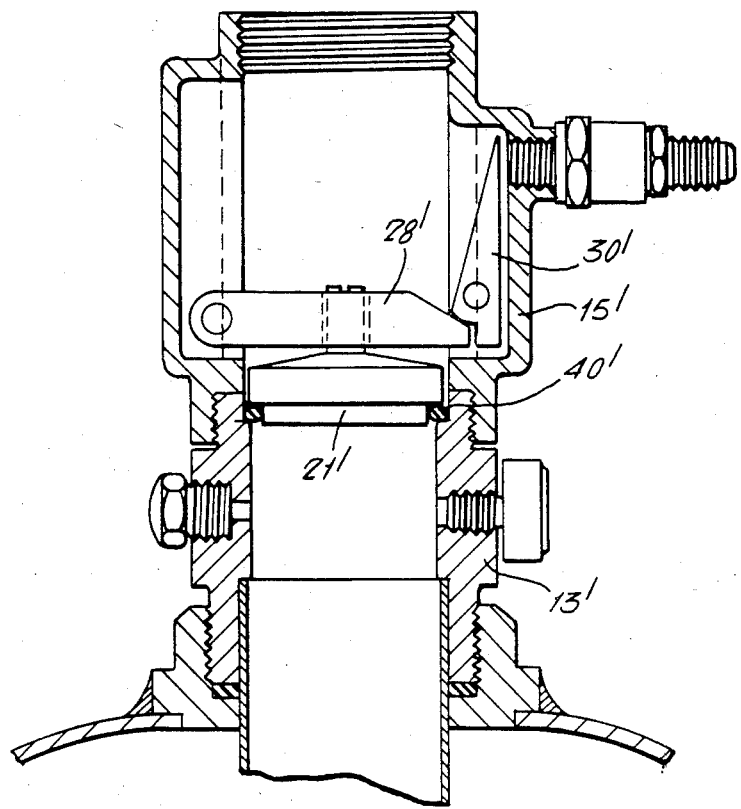
FIG. 4 is an axial cross-section of an alternative embodiment

In an alternative embodiment, illustrated in FIG. 4, the diaphragm is dispensed with and a solid closure member 21' is coupled directly to arm 28' in place of backing plate 26. Sealing ring 40' may be supplemented as a train of similarly trapped rings. On actuation of latch 30' the whole assembly of arm 28' and closure member 21' lifts away from the sealing ring(s) 40' to open the valve.

Figure 5:
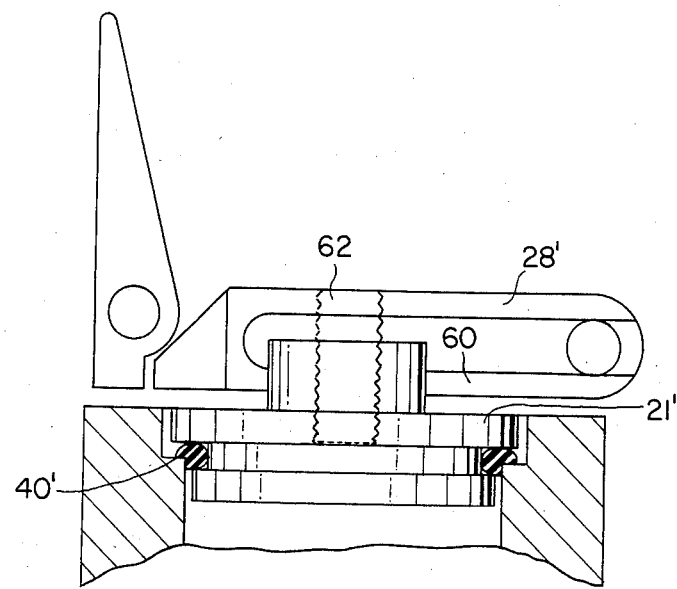
FIG. 5 is an elevation partially in cross-section of a further alternative embodiment.
Figure 6:
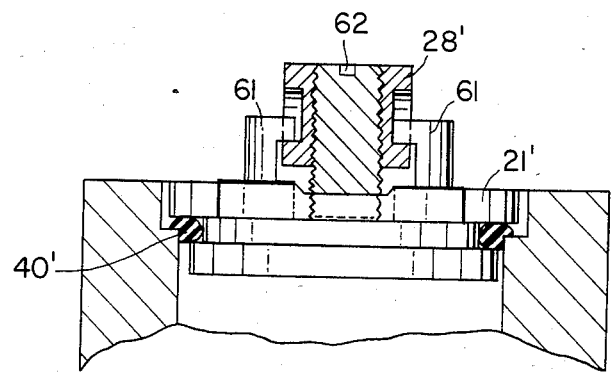
FIG. 6 is a transverse section through the embodiment of FIG. 5.

The embodiment shown in FIG. 5 is generally similar to that of FIG. 4. In this embodiment, the arm 28' is of I-shaped cross-section, and the solid closure member 21' is slidably mounted on the lower flange 60 of the arm 28', by means undercut projecting lugs 61. In this manner the closure member 21' is able to slide longitudinally of the arm 28' and therefore transversely relative to the axis of the valve. The projecting lugs 62 of the closure member 21 are a loose fit on the lower flange 60 of the arm 28' whereby the closure member can move through limited distances perpendicularly to the plane of the lower flange 60 and also generally parallel to the plane of the lower flange 60 in direction at right angles to the longitudinal axis of the arm 28'. In this manner the closure member is able to automatically adjust and center itself relative to the valve body as the arm is swung into position when initially closing the valve.

When the closure member is correctly positioned, a screw 62 carried by the arm 28' is tightened into engagement with the closure member in order to take up the play and to apply the necessary sealing pressure to the sealing ring 40'.

This form of mounting for the closure member provides for greater freedom of movement for the closure member than the adjustable male/female coupling previously described and thereby permits accurate centering of the closure member, even when the parts are manufactured to wide manufacturing tolerances. In addition it permits the closure member to be of increased depth without interfering with the generally arcuate movement of the closure member as the arm is swung between its open and closed positions.

I claim:

1. In a valve for sealing off pressurized fluid for an extended period, a body defining a fluid passageway therethrough;
    closure means for said passageway, said closure means including an arm pivotal on said body between a position in which the valve is held closed, and a valve open position,
    catch means for retaining said arm in the valve closed position against the pressure exerted by said fluid,
    means mounting the catch means for pivotal movement about an axis, and means for pivoting the catch means in a first pivotal direction whereby to release the arm, wherein the improvement comprises means defining an engagement surface on the catch means, means defining an engagement surface on the arm co-operating with the engagement surface on the catch means, means defining an abutment surface on the catch means adjacent to and transverse to said catch means engagement surface, and means defining an abutment surface on the outer extremity of said arm adjacent to and transverse to said arm engagement surface to engage the abutment surface on the catch means in the valve closed position, the pressure of said fluid, in the valve closed position, acting via said arm to urge said arm engagement surface against said catch means engagement surface in a line of action which is displaced from said pivot axis to form a moment to pivot the catch means in a direction opposed to said first direction to move the abutment surface on the catch means into engagement with the abutment surface on the arm.

2. In a valve for sealing off pressurized fluid for an extended period, a body defining a fluid passageway therethrough;

closure means for said passageway, said closure means including an arm pivotal on said body between a position in which the valve is held closed, and a valve open position, catch means for retaining said arm in the valve closed position against the pressure exerted by said fluid;

means for releasing the catch means whereby to release the arm; and a valve closure member carried by the arm, said closure member carrying sealing ring means to seal said passageway in the valve closed position, wherein the improvement comprises means mounting said closure member for movement along the arm in a direction longitudinally of the arm, and for movement laterally of the arm to permit centering of the closure member within the passageway; and screw means carried by the arm and co-operating with the closure member, said screw means being tightened to retain the closure member in its centered position.

* * * * *